(12) United States Patent
Warren et al.

(10) Patent No.: US 8,500,186 B2
(45) Date of Patent: Aug. 6, 2013

(54) BALLISTIC PROTECTION SUN VISOR APPARATUS

(75) Inventors: David Warren, Stone Ridge, NY (US); Scott VanNorman, Stone Ridge, NY (US)

(73) Assignee: Armordynamics, Inc., New York, NY (US)

( * ) Notice: Subject to any disclaimer, the term of this patent is extended or adjusted under 35 U.S.C. 154(b) by 147 days.

(21) Appl. No.: 12/859,069

(22) Filed: Aug. 18, 2010

(65) Prior Publication Data

US 2012/0043781 A1 Feb. 23, 2012

(51) Int. Cl.
*B60J 3/00* (2006.01)

(52) U.S. Cl.
USPC .................................................. 296/97.5

(58) Field of Classification Search
USPC .............................. 296/97.1, 97.5, 97.6, 97.8
See application file for complete search history.

(56) References Cited

U.S. PATENT DOCUMENTS

| | | | | |
|---|---|---|---|---|
| 3,754,810 A * | 8/1973 | Starczewski et al. | .... | 359/488.01 |
| 5,487,323 A * | 1/1996 | Madden, Jr. | ................. | 89/36.08 |
| 5,873,621 A * | 2/1999 | Kuighadush et al. | ........ | 296/97.8 |
| 5,882,059 A * | 3/1999 | Romero | ...................... | 296/97.6 |
| 6,164,181 A * | 12/2000 | Bruner | ......................... | 89/36.02 |
| 6,176,539 B1 * | 1/2001 | Westerman | .................. | 296/97.6 |
| 6,264,265 B1 * | 7/2001 | Hestehave et al. | ........... | 296/97.6 |
| 6,951,162 B1 * | 10/2005 | Shockey et al. | .............. | 89/36.11 |
| 7,225,718 B1 * | 6/2007 | Grove et al. | ................. | 89/36.09 |
| 7,389,718 B1 * | 6/2008 | Carter et al. | ................. | 89/36.02 |

* cited by examiner

*Primary Examiner* — Glenn Dayoan
*Assistant Examiner* — Pinel Romain
(74) *Attorney, Agent, or Firm* — Andrews Kurth LLP; Sean Wooden; Matthew J. Esserman (57) ABSTRACT

A ballistic visor that may act as a sun visor or be installed on an existing sub visor and that provides protection against ballistic rounds is described. The ballistic visor includes a plurality of panels. Each panel is substantially the size of a vehicle windshield sun visor and includes an outer layer of ballistic fabric that permits ballistic rounds to penetrate the ballistic visor and prevents ballistic rounds or ballistic round fragments from exiting the ballistic visor and an inner core of semi-rigid or rigid material surrounded by the outer layer of ballistic fabric and capable of stopping ballistic rounds. The ballistic panel further includes a connection between two of the plurality of panels that enables the ballistic visor to be expanded so that one of the two connected panels hangs below the other of the two connected panels. The connected ends of the two connected panels overlap.

20 Claims, 6 Drawing Sheets

BALLISTIC PROTECTION SUN VISOR APPARATUS

BACKGROUND

State and local law enforcement personnel are exposed to many situations where they are subject to gunfire assaults from criminals. In many of those situations, law enforcement personnel are in their vehicles. In some cases, vehicle doors are used as shields to protect law enforcement personnel against gunfire. However, even when vehicle doors are armored, the window glass in the vehicle doors, and the window glass in the front and rear windshields, is vulnerable to gunfire. This vulnerability leaves the law enforcement personnel in the vehicle exposed to potentially lethal threats. The use of ballistic glass, which can protect against gunfire, in law enforcement vehicles is limited because of its excessive weight and cost. Indeed, ballistic glass is prohibitively expensive.

There is a need for an easy to use, easy to install, inexpensive apparatus to protect law enforcement personnel in vehicles from gunfire directed toward the front door windows or the front windshield.

SUMMARY

Embodiments described herein have numerous advantages, including overcoming the defects of the prior art described above. These advantages may be achieved by a ballistic visor including a plurality of panels. Each panel is substantially the size of a vehicle windshield sun visor and includes an outer layer of ballistic fabric that permits ballistic rounds to penetrate the ballistic visor and prevents ballistic rounds or ballistic round fragments from exiting the ballistic visor and an inner core of semi-rigid or rigid material surrounded by the outer layer of ballistic fabric, substantially thicker than the outer layer and capable of stopping ballistic rounds. The ballistic panel further includes a connection between two of the plurality of panels that enables the ballistic visor to be expanded so that one of the two connected panels hangs below the other of the two connected panels. The connected ends of the two connected panels overlap.

These advantages may also be achieved by a ballistic visor including two connected panels. Each panel is substantially the size of a vehicle windshield sun visor and includes an outer layer of ultra-high molecular weight polyethylene (UHMWPE) ballistic fabric that permits ballistic rounds to penetrate the ballistic visor and prevents ballistic rounds or ballistic round fragments from exiting the ballistic visor and an inner core of ultra-high molecular weight polyethylene (UHMWPE) material surrounded by the outer layer of ballistic fabric and capable of stopping ballistic rounds. The ballistic visor also includes a living hinge between the two panels that enables the ballistic visor to be expanded so that one of the two connected panels hangs below the other of the two connected panels, in which connected ends of the two connected panels overlap, and one or more Velcro straps affixed to one of the two panels. The straps may be used to connect the ballistic visor to an existing vehicle sun visor so that the ballistic visor, when expanded, substantially covers a vehicle window.

BRIEF DESCRIPTION OF THE DRAWINGS

The detailed description may refer to the following drawings, wherein like numerals refer to like elements, and wherein.

DETAILED DESCRIPTION

Described herein are embodiments of a ballistic protection sun visor apparatus, otherwise known as a ballistic visor. Embodiments of the ballistic visor provide protection to vulnerable and previously unprotected areas of law enforcement and other vehicles. Moreover, embodiments provide this protection in a concealable, low-weight, relatively inexpensive manner. Ballistic visor embodiments may even be easily transferred from vehicle to vehicle or even used as a portable, individual ballistic protection device. Embodiments of the ballistic visor are rated to protect up to National Institute of Justice (NIJ) level 3A ballistic rounds. By being able to stop up to NIJ level 3A ballistic rounds, ballistic visor may stop most handgun rounds and dangerous secondary fragments as well. Embodiments use a combination of both soft and rigid composite plastics.

By utilizing a vehicle's existing hinged visors or as an original equipment manufacture (OEM) vehicle visor, ballistic visors may be deployed for protection to either the front or side window. In addition to an ability to stop NIJ level 3A ballistic rounds, embodiments have the ability to completely trap ballistic rounds within the ballistic visor, preventing bullet deflection or ricochet.

Embodiments of the ballistic panel may include one or more panels connected in a bi-fold, tri-fold, or other manner. In a typical bi-fold manner, two panels are connected so that a second panel folds onto a first panel when not in use and is unfolded to expand the ballistic panel when in use. In a tri-fold, three panels are connected so that a third panel folds onto a second panel which folds onto a first panel when not in use, and the first and second panels may be unfolded to expand the ballistic panel when in use. See below for a further description.

As is also described below, embodiments of each panel may include layers of a soft-composite material surrounding a core of semi-rigid and/or rigid composite interior (e.g., rigid ballistic material). Generally, the core will be substantially rigid. The exterior, soft-composite material layers (e.g., ballistic fabric) may provide a unidirectional membrane or shell that is fabricated to allow a bullet to pass through into the panel, but prevents the bullet from passing through the other side (i.e., prevents the bullet from exiting the panel). In other words, the soft-composite material layers are designed to allow the bullet to pass through in one direction, but to prevent the bullet from passing through in the opposing direction. The composite interior core traps the mass of the bullet after it has passed through the unidirectional membrane. The composite interior may be entirely constructed from a rigid material, a semi-rigid material or a combination of both (e.g., semi-rigid at some points were some flexibility/bendability is desired).

Figure 1A:
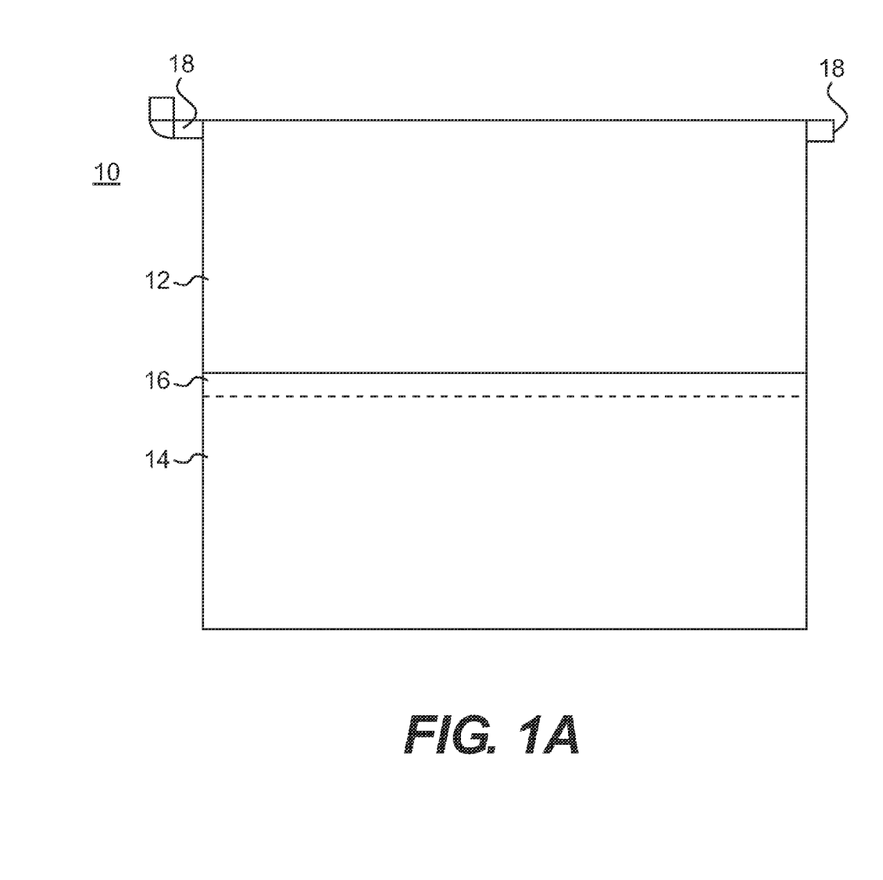
FIG. 1A is a diagram of an embodiment of an expanded ballistic visor.
Figure 1B:
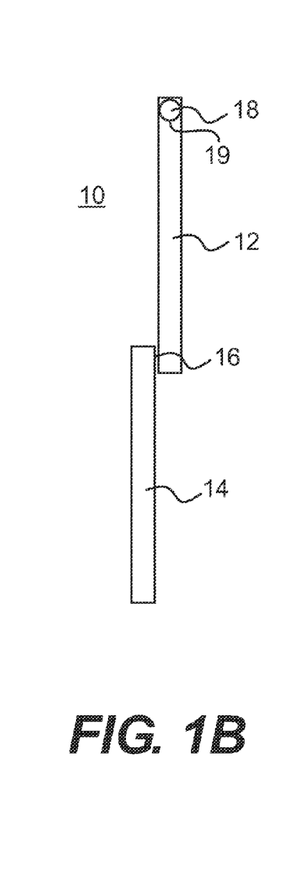
FIG. 1B is a diagram providing a side view of an embodiment of an expanded ballistic visor.
Figure 1C:
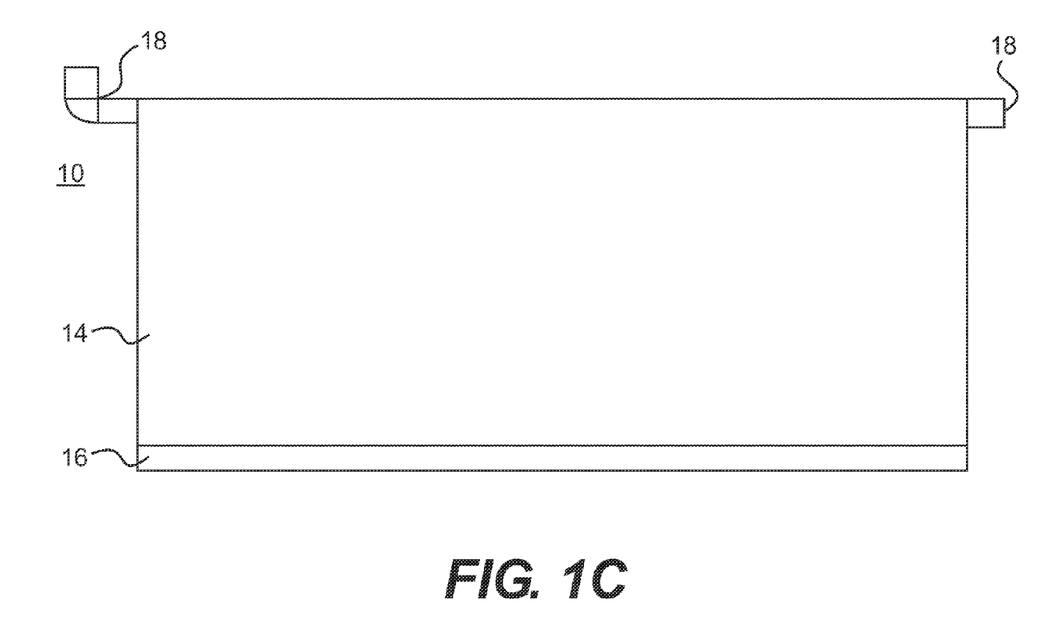
FIG. 1C is a diagram of an embodiment of a folded ballistic visor.
Figure 1D:
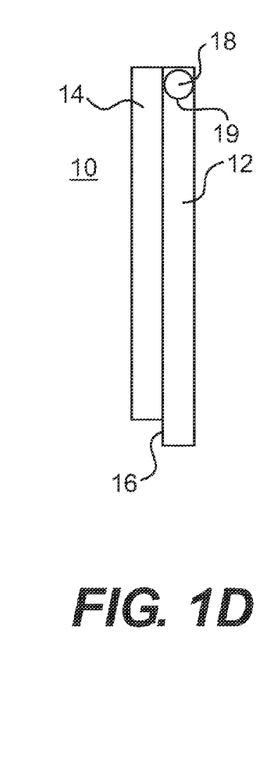
FIG. 1D is a diagram providing a side view of an embodiment of a folded ballistic visor.

With reference now to FIGS. 1A-1D, shown is an embodiment of a ballistic protection sun visor apparatus, or ballistic visor 10. Embodiments of ballistic visor 10 include a first panel 12 and a second panel 14, connected by a visor hinge 16. In FIG. 1A, ballistic visor 10 is shown in expanded form, with second panel 14 unfolded and hanging below first panel 12. See FIG. 1B for side view of this expanded form. When not in use, second panel 14 may be folded onto first panel 12, as shown in FIGS. 1C-1D. FIG. 1D shows a side view of the folded form of ballistic visor 10. Consequently, the embodiment of ballistic visor 10 is a bi-fold version, as described above. Ballistic visor 10 shown may also include a visor arm 18 for connecting with ceiling of vehicle. As shown FIGS. 1A-1D, visor arm 18 extends through ballistic visor 10 through opening 19 (see FIGS. 1B and 1D) that extends through length ballistic visor 10. A typical visor arm 18 may rotate so that ballistic visor 10 may be situated behind front windshield or front door window. Visor arm 18 may be configured for either driver- or passenger-side use.

Visor hinge 16 may be specially-designed so as to enable second panel 14 to fold onto first panel 12 (see FIG. 1D), and to un-fold into expanded position shown in FIGS. 1A-1B, while ensuring that soft-composite material layers run continuously from the top to the bottom of the ballistic visor 10 when in use. Moreover, as shown in FIG. 1B, visor hinge 16 may be designed so that second panel 14 and first panel 12 overlap when in expanded position. This overlap (e.g., a one (1) inch overlap) results in the interior composite material core of each panel overlapping, eliminating the possibility of a deflected ballistic round passing through the visor 10 between the interior cores.

With continuing reference to FIGS. 1C-1D, the folded view of the ballistic visor 10 shows that embodiments of ballistic visor 10 have a slim, low-profile that lacks mass and enables the ballistic visor 10 to be easily concealed and stowed. Accordingly, the ballistic visor 10 may easily replace, or used in place of, existing sun visors, without interfering with the operation of the vehicle. Ballistic visors 10 are effective sun visors as well, block sun light from interfering with the driver's view.

In order to keep the ballistic visor 10 from unexpectedly unfolding into the expanded position, embodiments of the ballistic visor 10 may include Velcro strips, or other means, for securing the bottom (i.e., the bottom when in the expanded position) of the second panel 14 to the top of the first panel 12 when in the closed position. A pull-tab, or similar means, may be located on the bottom-edge of the second panel 14 to allow for quick and easy deployment (e.g., unfolding into expanded position) of the ballistic visor 10 when needed. Pull-tab may be pulled downward to deploy ballistic visor 10.

Figure 2A:
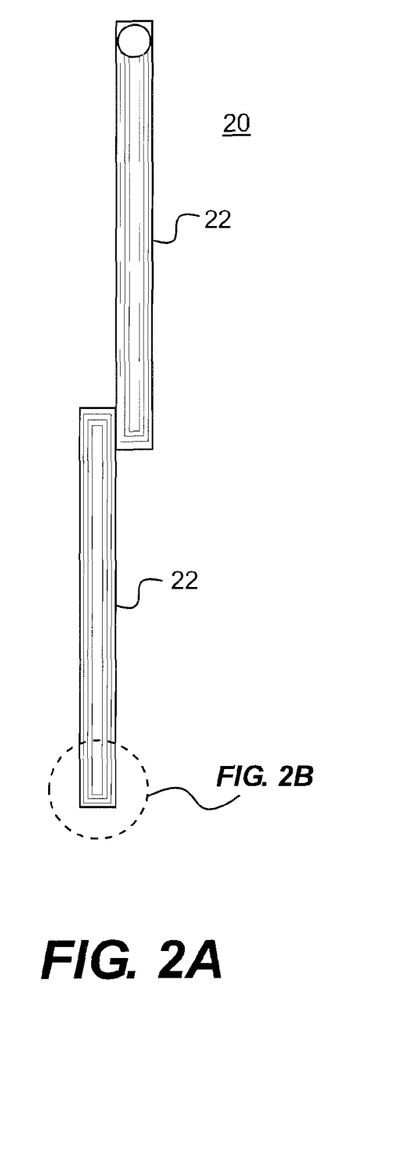
FIG. 2A is a cross-sectional diagram of an embodiment of an expanded ballistic visor.
Figure 2B:
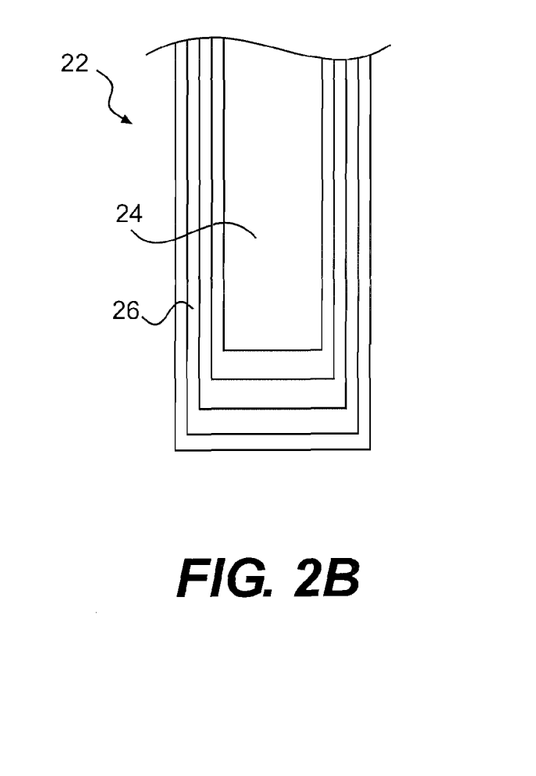
FIG. 2B is a cross-sectional diagram providing a close-up view of embodiment of a ballistic visor.

With reference now to FIGS. 2A and 2B, shown are cross-sectional views of an embodiment of ballistic visor 20. Embodiments of ballistic visor 20 may be constructed with ultra-high molecular weight polyethylene (UHMWPE) material. UHMWPE is a preferred ballistic material due to a high strength-to-weight ratio, which is 10 to 100 times higher than that of steel and 40% higher than Aramid. UHMWPE, which may also be abbreviated as UHMW, is also known as high-modulus polyethylene (HMPE) or high-performance polyethylene (HPPE) and is a subset of thermoplastic polyethylene. UHMWPE has extremely long chains, with molecular weight numbering in the millions, usually between 2 and 6 million. The longer chain serves to transfer load more effectively to the polymer backbone by strengthening intermolecular interactions. This load transfer effect results in a very tough material, with the highest impact strength of any thermoplastic presently made. UHMWPE is highly resistant to corrosive chemicals, with exception of oxidizing acids, has extremely low moisture absorption, has a very low coefficient of friction, is self-lubricating, and is highly resistant to abrasion (15 times more resistant to abrasion than carbon steel). UHMWPE's coefficient of friction is significantly lower than that of nylon and acetal, and is comparable to that of Teflon, but UHMWPE has better abrasion resistance than Teflon. UHMWPE is also odorless, tasteless, and nontoxic.

Polymerisation of UHMWPE was commercialised in the 1950s by Ruhrchemie AG, which changed names over the years; today UHMWPE powder materials are produced by Ticona, Braskem, and Mitsui. UHMWPE is available commercially either as consolidated forms, such as sheets or rods, and as fibers. UHMWPE powder may also be directly molded into the final shape of a product. Because of its resistance to wear and impact, UHMWPE continues to find increasing industrial applications, including the automotive and bottling sectors, for example. Since the 1960s, UHMWPE has also been the material of choice for total joint arthroplasty in orthopedic and spine implants. UHMWPE fibers commercialised in the late 1970s by the Dutch chemicals company DSM are widely used in defense applications and medical devices as well.

Ideally, the UHMWPE used in ballistic visors will be flame-retardant or resistant. Alternatively, the material will be coated with a flame-retardant or resistant substance.

With continuing reference to FIGS. 2A and 2B, embodiments of ballistic visor 20 may be constructed with two different forms of UHMWPE ballistic material. In the interior of embodiments of each panel 22 in ballistic visor 20 may be a core 24 of rigid or semi-rigid (or a combination of semi-rigid and rigid) NIJ level 3A UHMWPE. UHMWPE core 24 is responsible for actually stopping a ballistic round that impacts the ballistic visor 20. Examples UHMWPE material used for the UHMWPE core 24 include Tensylon®, Dyneema®, and/or Spectra®. Core 24 may be formed from multiple layers of UHMWPE pressed together. For example, core 24 is formed from 2-4 layers of semi-rigid UHMWPE pressed together. The layers may each be the same UHMWPE material, or the core 24 may include layers of different UHMWPE material. Indeed, layers of rigid and semi-rigid UHMWPE material may be combined to form core 24, e.g., in order to provide desired level of rigidity for core 24, and ergo panel 22. Moreover, more or less layers of UHMWPE material may be used for core 24 in order to achieve desired rigidity (e.g., generally, the more layers, the greater the rigidity). A rigid material will, generally, not bend, while a semi-rigid will bend to certain extent. Other materials that may be used for semi-rigid or rigid core, in combination with UHMWPE or otherwise, include E-glass, S-glass, aluminum, Kevlar®, aramid, Twaron® and other ballistic materials.

At the exterior of embodiments of each panel 22 in ballistic visor 20 may be layers of UHMWPE ballistic fabric 26 surrounding a UHMWPE core 24. Ballistic fabric 26 may include a plurality of layers (e.g., 2-4 layers of UHMWPE ballistic fabric on each side of panel 22) forming a pocket into which UHMWPE core 24 is placed. The material that may be used for the layers of UHMWPE ballistic fabric 26 include, e.g., Cordura®, other Nylon-6,6 materials, aramid, Kevlar®, and Twaron®. Different linear mass densities of ballistic fabric 26 may be used; embodiments use one or more layers of 1,000 denier Cordura®. Likewise, ballistic fabric 26 may be unidirectional (e.g., designed to only allow ballistics to pass through in one direction, having greater stopping power in one direction) or directional (e.g., having equal stopping power in both directions). However, unidirectional fibers are more typically used as unidirectional fibers are stronger; layers of unidirectional fabric will have greater stopping power in the one direction than comparable layers of directional fabric will have in either direction. Ballistic fabric 26 may form fabric shell around core 24.

Embodiments of ballistic visor 20 may include more than one core 24 in each panel 22. Additional cores 24 may improve the stopping ability of the ballistic panel 20, but may sacrifice some of the compactness and conceal-ability of the ballistic visor 20.

UHMWPE ballistic fabric 26 layers allow the ballistic round to penetrate or pass into the interior of ballistic visor 20 so as to strike the interior UHMWPE core 24. Once the ballistic round strikes the UHMWPE core 24, the surrounding layers of ballistic fabric 26 then 'catch' the ballistic round, or its remnants, and prevent the ballistic round, or its remnants, from exiting the ballistic visor 20. Accordingly, the multiple, surrounding layers of ballistic material 26 that allow ballistic rounds to enter but not exit the ballistic visor 20 are important; if impacting ballistic rounds were not contained within the ballistic visor 20, there would be a significant risk that ballistic rounds could hit the ballistic visor 20 (striking the core 24) and deflect/ricochet off and hit occupants in the vehicle. Moreover, by having core 24 surrounded on both sides by ballistic fabric 26, ballistic visor 20 is reversible and may, therefore, stop rounds that strike either side with the same ability.

Figure 3A:
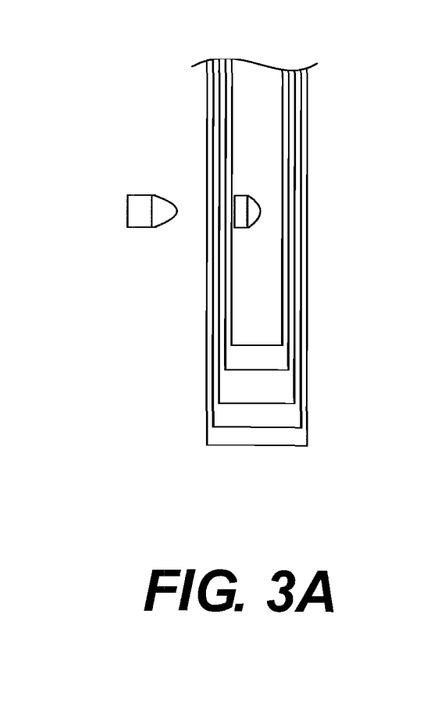
FIGS. 3A-3C are cross-sectional diagram providing close-up views of a ballistic round impacting an embodiment of a ballistic visor.
Figure 3B:
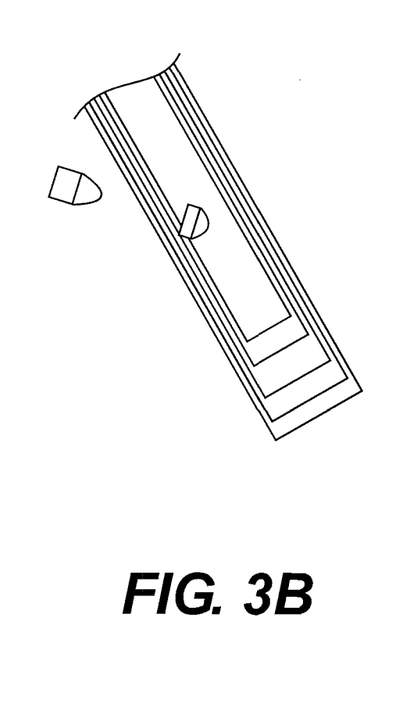
Figure 3C:
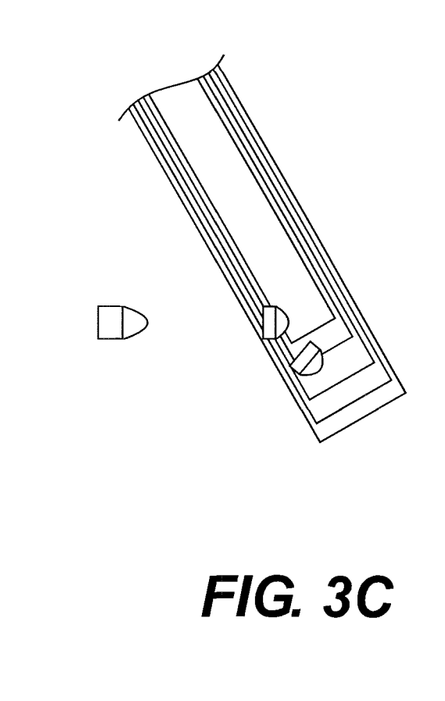

With reference now to FIGS. 3A-3C, shown is a cross-sectional view of an embodiment of ballistic visor 30. The views of ballistic visor 30 shown also illustrate ballistic rounds impacting ballistic visor 30 and the effect of ballistic visor 30 on the impacting rounds and of the impacting rounds on the ballistic visor 30. Ballistic visor 30, as described above, includes one or more panels 32 with layers of ballistic fabric 34 and a rigid or semi-rigid core 36. As shown in FIG. 3A, a ballistic round 38 impacts on panel 32, penetrates ballistic fabric 34 and impacts core 36. Upon striking core 36, ballistic round 38 is compacted and deformed and trapped by core 36 and ballistic fabric 34.

With reference now to FIG. 3B, ballistic visor 30 is shown tilted at an angle away from source of ballistic round 38 (e.g., towards interior of vehicle). Ballistic visor 30 may be tilted as of the result of a previous ballistic round impact which imparted its momentum on the ballistic visor 30 and caused ballistic visor 30 to swing away from ballistic round source. Again, ballistic round 38 impacts on panel 32, penetrates ballistic fabric 34 and impacts core 36. Upon striking core 36, ballistic round 38 is compacted and deformed and trapped by core 36 and ballistic fabric 34.

With reference now to FIG. 3C, ballistic visor 30 is again shown tilted at an angle away from source of ballistic round 38. In this example, ballistic round 38 impacts on panel 32 closer to bottom of panel 32. Because of the angle of impact, the deformed round 38 is not trapped by the core 36. However, because the ballistic fabric 34 is unidirectional, the deformed round 38 does not penetrate and exit through the ballistic fabric 34, but is instead trapped by the ballistic fabric 34 inside the panel 32.

Figure 4A:
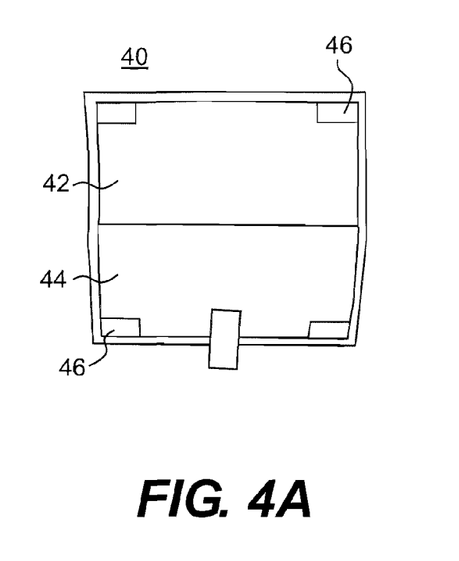
FIGS. 4A-4E are diagrams illustrating different views of an embodiment of a ballistic visor which may attach to existing vehicle sun visors.

With reference now to FIGS. 4A-4E, shown is an embodiment of a ballistic visor 40. Ballistic visor 40 is a visor attachment that may be secured to an existing vehicle sun visor. With reference now to FIG. 4A, shown is an opened, expanded view of ballistic visor 40 showing first panel 42 and second panel 44. Second panel 44 is unfolded from first panel 42 and hangs below first panel 42. First panel 42 and second panel 44 may include attachment mechanisms 46, or other means of attaching, such as Velcro. When folded, attachment mechanisms 46 secure second panel 44 to first panel 42. Second panel 44 may also include pull-tab 48. Pull-tab 48 may be pulled by user to open or expand ballistic visor 40, unfolding second panel 44 from first panel 42.

Figure 4B:
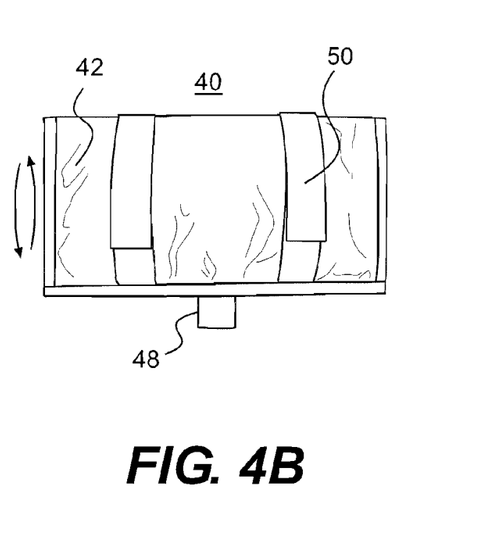

With reference now to FIG. 4B, shown is a folded view of an embodiment of ballistic visor 40. Shown is backside view of first panel 42 with straps 50 for securing ballistic visor 40 to existing vehicle sun visor. Straps 50, or other attachment mechanism, may be used to install ballistic visor 40 onto existing vehicle sun visors. Straps 50 may be Velcro straps, or include other means for securing (e.g., snaps, buttons, magnets, clamps, etc.). In this manner, ballistic visor 40 embodiment shown may be added to existing vehicles, moved from one vehicle to another, removed from a vehicle, and otherwise used as a portable ballistic protection device. Also shown is pull-tab 48 which extends upwards from bottom of folded second panel 44.

Figure 4C:
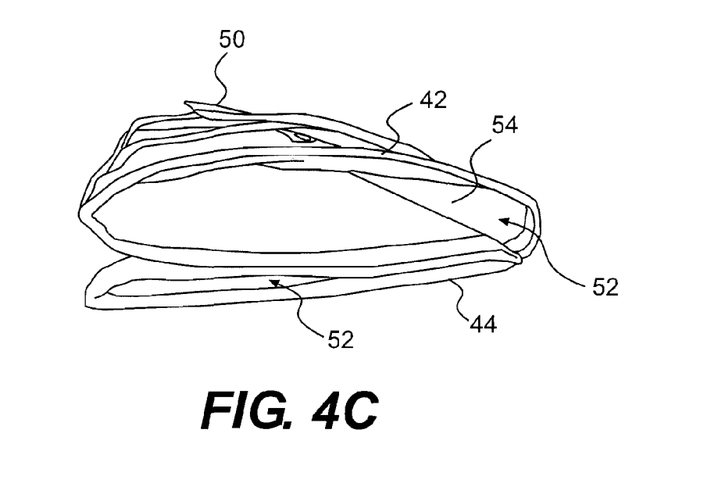

With reference now to FIG. 4C, shown is a side, end view of an embodiment of a closed ballistic visor 40. This side, end view shows openings 52 in first panel 42 and second panel 44. Openings 52 illustrate interior layers of ballistic fabric 54. As noted above, embodiments of ballistic visor 40 panels may include layers of ballistic fabric 54 surrounding an interior core (not shown here). Layers of ballistic fabric 54 may form a pocket, as shown through opening 52, into which core is placed. As noted above, ballistic fabric may be UHMWPE ballistic fabric and core may be a UHMWPE core. Openings 52 in panels of ballistic visor 40 may be permanently closed after core is placed within. Alternatively, openings 52 may be left open or re-sealably closed so that core may be replaced with new core when core has been damaged by ballistic round impacts or otherwise.

Also shown in FIG. 4C is that the outer layer of ballistic fabric 54 on both the front side and back side of the panels may be formed by one or more layers of single pieces of ballistic fabric extending over both the first panel 42 and the second panel 44. By fabricating the ballistic visor 40 in this manner, ballistic visor 40 may only have seems at the top and bottom ends of the ballistic visor 40 (when fully extended). Alternatively, the outer layer of ballistic fabric 54 may be formed by one or more layers of single pieces of ballistic fabric extending or wrapping completely around both or all panels. In this manner, ballistic visor 40 would only have one seem at one end where the single pieces of ballistic fabric come together. By using a single piece of ballistic fabric extending over both panels, either on each side or both sides of the panels, seems connecting pieces of ballistic fabric are avoided at the center hinge (see FIG. 4D). This further strengthens center hinge, which would otherwise be weak point.

Figure 4D:
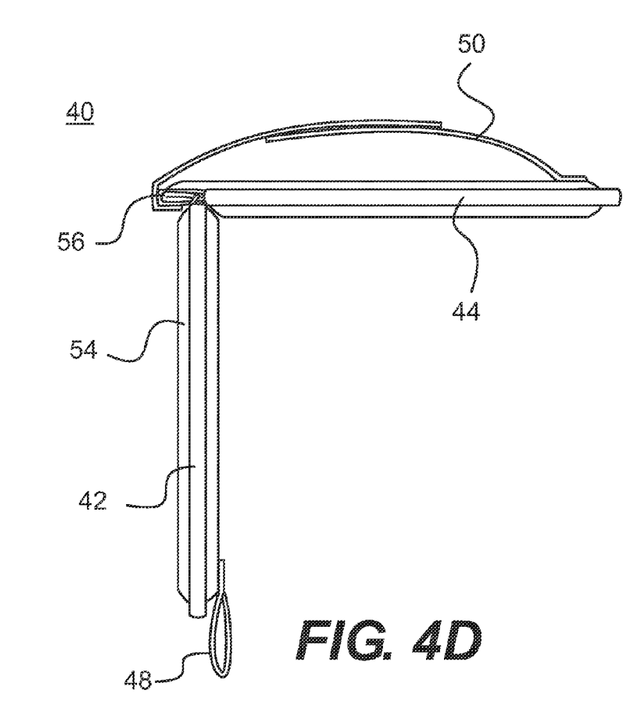

With reference now to FIG. 4D, shown is another side view of an embodiment of an expanded ballistic visor 40. Side view illustrates first panel 42, second panel 44, straps 50 and living hinge 56. This view illustrates how first panel 42 and second panel 44 overlap in living hinge 56. Specifically, both ballistic fabric 54 and semi-rigid or rigid core (not shown) of each panel 42, 44 overlap. Accordingly, living hinge 56 design prevents bullet penetration through ballistic visor 40 at center seam/hinge. The living hinge 56 may be formed, as shown, by sewing, stitching or otherwise securely connecting the outer layer of ballistic fabric 54 at one end of one of the panels, e.g., the second panel 44, to the outer layer of ballistic fabric 54 of the other panel, e.g., the first panel 42, some distance up from the end of the other panel. As shown in FIG. 4D, this causes the connected ends of each panel to overlap. If ballistic visor 40 includes additional panels, the additional panel junctions would preferably also include living hinges 56.

Figure 4E:
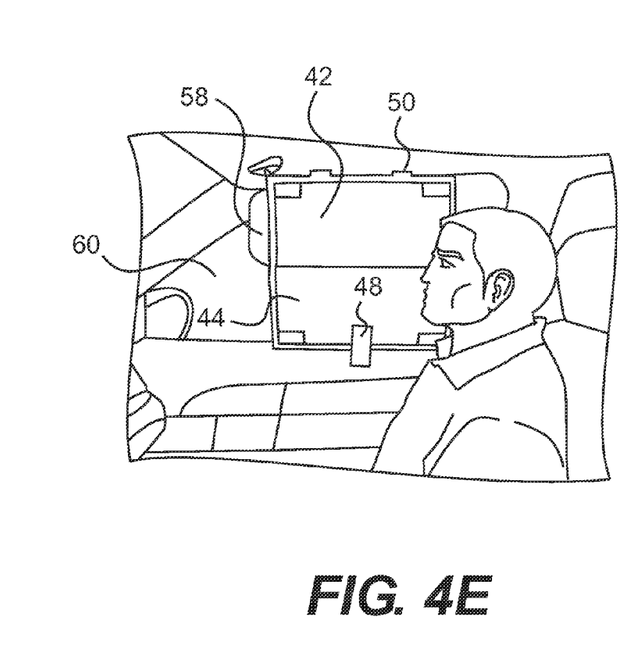

With reference now to FIG. 4E, shown is an embodiment of ballistic visor 40 installed on a vehicle sun visor 58. As shown, ballistic visor 40 is secured to sun visor 58 with straps 50. Ballistic visor 40 is expanded, with second panel 44 hanging below first panel 42 and obscuring most of side window 60 from view. In this manner, ballistic visor 40 protects vehicle occupants from ballistic rounds.

Embodiments of the ballistic visor, such as those illustrated and described herein, may be sized to fit different vehicles and different vehicle sun visors. For example, a larger vehicle, such as a truck or a SUV, may have large windshields and windows, and hence larger sun visors, then an ordinary police cruiser. The ballistic visor may be made larger by having additional panels, as described above, or by having larger panels. Generally, the ballistic visor panels will be substantially the size of a vehicle sun visor, although the panels may be smaller or larger than a sun visor. A typical ballistic visor may include panels approximately twenty inches (20") long and six inches (6") wide; panels may be made in a variety of widths and lengths. Likewise, panels may be made with a variety of thicknesses; for example, each panel may be approximately ¼" to ½" inch thick. The thickness and number of layers of ballistic fabric and, generally to a greater extent, the thickness and number of cores will dictate the thickness of each panel. Ideally, the panels will not be so thick as to interfere with the folding of panels to close the ballistic visor. Likewise, the panels' thickness will be such that portable embodiments of the ballistic visor, such as those illustrated in FIGS. 4A-4E, will be easily carried and stowed.

As noted above, ballistic visor embodiments may be a portable device or a permanent vehicle fixture that would replace existing sun visors. Alternatively, the ballistic visor may be part of the original vehicle manufacture. Accordingly, the ballistic visor may be manufactured via original equipment manufacturing.

As a portable device, ballistic visor may be removed from a vehicle and also used as a ballistic shield. The straps described above may be used to secure the ballistic visor to a user's arm or other body part. Indeed, multiple ballistic visors may be connected together using the straps to create a large shield and concealment device (e.g., for a shooter to hide behind). As noted above, ballistic visor may be made with or coated with flame-retardant or resistant material or substance.

As also noted above, the ballistic visor is preferably made to be reversible so that it can effectively stop ballistic rounds impacting on either side.

When used within a vehicle, ballistic visor may be positioned to act as concealment device or curtain for a user to hide behind. Likewise, portable ballistic visor embodiments may be positioned behind vehicle doors or seats (or other portion of a vehicle) to provide an additional level of protection. Similarly, portable ballistic visor may be positioned behind other structures (walls, doors, etc.) to provide an additional level of protection.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A ballistic visor including:
   a plurality of panels, wherein each panel is substantially the size of a vehicle windshield sun visor and includes:
   an outer layer of ballistic fabric that permits ballistic rounds to penetrate the ballistic visor and prevents ballistic rounds or ballistic round fragments from exiting the ballistic visor; and
   an inner core of greater thickness than the outer layer and surrounded by the outer layer of ballistic fabric, wherein the inner core is capable of stopping ballistic rounds and the inner core comprises ultra-high molecular weight polyethylene (UHMWPE) material;
   a connection between two of the plurality of panels that enables the ballistic visor to be expanded so that one of the two connected panels hangs below the other of the two connected panels, wherein connected ends of the two connected panels overlap; and
   a connection that connects the ballistic visor to a vehicle.

2. The ballistic visor of claim 1 wherein each panel has a front side and a back side, the outer layer of ballistic fabric is situated on both the front side and the back side of each panel, and the outer layer of ballistic fabric on the front side and the back side of each panel comprises one or more layers of ballistic fabric extending over the plurality of panels.

3. The ballistic visor of claim 1 wherein the outer layer of ballistic fabric of the two connected panels overlaps at the connection.

4. The ballistic visor of claim 1 wherein the inner core of the two connected panels overlaps at the connection.

5. The ballistic visor of claim 1 wherein the outer layer of ballistic fabric comprises a plurality of ballistic fabric layers on both sides of the inner core.

6. The ballistic visor of claim 1 wherein the ballistic fabric comprises ultra-high molecular weight polyethylene (UHMWPE) material.

7. The ballistic visor of claim 1 wherein the inner core comprises rigid ultra-high molecular weight polyethylene (UHMWPE) material.

8. The ballistic visor of claim 7 wherein the inner core comprises a plurality of layers of rigid UHMWPE material.

9. The ballistic visor of claim 7 wherein the inner core further comprises semi-rigid UHMWPE material.

10. The ballistic visor of claim 9 wherein the inner core comprises a plurality of layers of semi-rigid and rigid UHMWPE material.

11. The ballistic visor of claim 1 wherein the inner core is substantially rigid.

12. The ballistic visor of claim 1 wherein the plurality of panels consists of two panels.

13. The ballistic visor of claim 1 wherein the connection that connects the ballistic visor to said vehicle comprises one or more straps affixed to one of the plurality of panels, wherein the straps may be used to connect the ballistic visor to said sun visor so that the ballistic visor, when expanded, substantially covers a vehicle window.

14. The ballistic visor of claim 1 wherein the connection that connects the ballistic visor to said vehicle comprises a pivoting arm connecting the ballistic visor to said vehicle so that the ballistic visor may be pivoted to provide shading from sun rays impacting on the vehicle windshield or side window.

15. The ballistic visor of claim 1 further comprising a pull tab on one of the two connected panels wherein the pull tab may be pulled to expand the ballistic visor.

16. A portable ballistic visor including:
   two connected panels, wherein each panel is substantially the size of a vehicle windshield sun visor and includes:
   an outer layer of ultra-high molecular weight polyethylene (UHMWPE) ballistic fabric that permits ballistic rounds to penetrate the ballistic visor and prevents ballistic rounds or ballistic round fragments from exiting the ballistic visor; and an inner core of ultra-high molecular weight polyethylene (UHMWPE) material surrounded by the outer layer of ballistic fabric and capable of stopping ballistic rounds;

a living hinge between the two panels that enables the ballistic visor to be expanded so that one of the two connected panels hangs below the other of the two connected panels, wherein connected ends of the two connected panels overlap; and one or more Velcro straps affixed to one of the two panels, wherein the straps may be used to connect the ballistic visor to an existing vehicle sun visor so that the ballistic visor, when expanded, substantially covers a vehicle window.

17. The portable ballistic visor of claim 16 wherein the core comprises multiple layers of UHMWPE material.

18. The portable ballistic visor of claim 16 wherein the outer layer comprises multiple layers of UHMWPE ballistic fabric.

19. The ballistic visor of claim 1 wherein the connection that connects the ballistic visor to said vehicle comprises a connection to said sun visor pivoting arm of said vehicle.

20. A ballistic visor including:

a plurality of panels, wherein each panel is substantially the size of a vehicle windshield sun visor and includes:

an outer layer of ballistic fabric that permits ballistic rounds to penetrate the ballistic visor and prevents ballistic rounds or ballistic round fragments from exiting the ballistic visor; and an inner core of greater thickness than the outer layer and surrounded by the outer layer of ballistic fabric, wherein the inner core is capable of stopping ballistic rounds and the inner core comprises ultra-high molecular weight polyethylene (UHMWPE) material;

a connection between two of the plurality of panels that enables the ballistic visor to be expanded so that one of the two connected panels hangs below the other of the two connected panels, wherein connected ends of the two connected panels overlap; and one or more straps affixed to one of the plurality of panels, wherein the straps may be used to connect the ballistic visor to said sun visor so that the ballistic visor, when expanded, substantially covers a vehicle window.

* * * * *